United States Patent
Green

(10) Patent No.: US 6,598,064 B1
(45) Date of Patent: Jul. 22, 2003

(54) SPLIT MULTIPLIER ARRAY AND METHOD OF OPERATION

(75) Inventor: Daniel W. Green, Marlboro, MA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/477,487

(22) Filed: Jan. 4, 2000

(51) Int. Cl.[7] .................................................. G06F 7/52
(52) U.S. Cl. ........................................ 708/620; 708/625
(58) Field of Search ............................. 708/620, 625, 708/518

(56) References Cited

U.S. PATENT DOCUMENTS

| | | | | |
|---|---|---|---|---|
| 4,679,164 A | * | 7/1987 | Rearick | 708/620 |
| 4,754,421 A | * | 6/1988 | Bosshart | 708/620 |
| 6,032,170 A | * | 2/2000 | Guttag et al. | 708/620 |
| 6,286,023 B1 | * | 9/2001 | Purcell et al. | 708/625 |
| 6,286,024 B1 | * | 9/2001 | Yano et al. | 708/625 |
| 6,370,559 B1 | * | 4/2002 | Hoffman | 708/625 |

* cited by examiner

Primary Examiner—Tan V. Mai

(57) ABSTRACT

A multiplier circuit for use in a data processor. The multiplier circuit contains a partial products generating circuit that receives a multiplicand value and a multiplier value and generates a group of partial products. The multiplier circuit also contains a split array for adding the partial products. A first summation array has a first group of adders that sum the even partial products to produce an even summation value. A second summation array has a second group of adders that sum the odd partial products to produce an odd summation value. The even and odd summation values are then summed to produce the output of the multiplier.

14 Claims, 7 Drawing Sheets

SPLIT MULTIPLIER ARRAY AND METHOD OF OPERATION

TECHNICAL FIELD OF THE INVENTION

The present invention is directed, in general, to processing systems and, more specifically, to a multiplier array containing an odd and an even multiplier array for use in a microprocessor.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in mathematical calculations, particularly floating point calculations. However, with the trend to increase the integer unit size to 64 bits, many of the problems that previously present only in floating point units are now also occurring in the integer unit. Some mathematical operations, such as multiplication and division, cause significant delays during program execution. Many attempts have been made to design multipliers that have the least number of gate delays possible and that consume the least amount of chip area. A conventional multiplier has a first stage that contains a partial products generating circuit that receives a multiplicand and a multiplier and generates a plurality of partial products therefore. The partial products are then summed in a second stage that contains either a tree adder or an array adder.

For example, the floating point unit in a microprocessor may contain a multiplier that accepts a 64-bit multiplicand and a 64-bit multiplier and generates 64 partial products, P0 through P63. P0 is the partial product formed by multiplying the multiplicand by the least significant bit of the multiplier. P63 is the partial product formed by multiplying the multiplicand by the most significant bit of the multiplier. Each partial product is a 64-bit value.

The 64 partial products may then be summed in tree structure, such as a Wallace tree. The tree structure may comprise a first level of 64/3=22 carry-save adders (CSA), each of which adds three 64-bit partial products to generate an output containing a 74-bit sum and a 74-bit carry value. The 22×2=44 outputs of the first level of CSAs are then summed by a second level of 22/3=15 CSAs, each of which adds three outputs from the first level to generate an output containing a 74-bit sum and a 74-bit carry value. The tree structure continues to narrow in subsequent levels of CSAs, wherein each level sums the outputs of the preceding level of CSAs. The 128-bit sum and 128-bit carry outputs of a final CSA are then added in a carry propagate adder (CPA) stage to produce a 64-bit sum output and a single carry bit output. Six levels of CSAs are required to reduce the 64 partial products to the output of the final CSA. Thus, the delay through the tree structure is six times the delay of an individual carry-save adder.

Alternatively, the 64 partial products may be summed in an array of 64 CSAs. In a 64 CSA array, a first CSA may add, for example, the two least significant partial products, P0 and P1. A second CSA then adds the third partial product, P2, to the output of the first CSA. A third CSA then adds the fourth partial product, P3, to the output of the second CSA. The process continues until a sixty-third CSA adds the sixty-fourth partial product, P63, to the output of the sixty-second CSA. Finally, the 64-bit sum and 64-bit carry outputs of the sixty third final CSA are added in a carry propagate adder (CPA) stage to produce a 64-bit sum output and a single carry bit output. Thus, the delay through the array structure is sixty-three times the delay of an individual carry-save adder.

Both the array structure and the tree structure have distinct advantages and disadvantages. The array structure has a comparatively large delay, one for each CSA. However, the array structure is fairly easy to lay out on a silicon wafer because of the repeating pattern of each succeeding CSA. The gate delay is constant for each stage and can be effectively minimized.

The tree structure has a comparatively small delay, at least theoretically. However, the tree structure is limited by the asymmetric routing of its signal lines. When the tree structure is laid out on a silicon wafer and is compressed into a more or less rectangular shape in order to minimize wafer space, there is a large amount of non-uniform line length and non-constant routing density. These problems tend to offset the speed performance realized by the reduced number of gate delays.

Therefore, there is a need in the art for improved microprocessor that execute mathematical operations more rapidly. In particular, there is a need for an improved multiplier that has the simple design advantages of an array structure for summing partial products, but which does not suffer the excessive delays associated with conventional array structures.

SUMMARY OF THE INVENTION

The limitations inherent in the prior art described above are overcome an improved multiplier circuit according to the principles of the present invention. In an advantageous embodiment, the multiplier circuit comprises: 1) a partial products generating circuit capable of receiving a multiplicand value and a multiplier value and generating therefrom a plurality of partial products; 2) a first summation array comprising a first plurality of adders capable of summing a first subset of the plurality of partial products to thereby produce a first summation value; and 3) a second summation array comprising a second plurality of adders capable of summing a remaining subset of the plurality of partial products to thereby produce a second summation value, wherein the remaining subset of the plurality of partial products comprises all of the plurality of partial products not included in the first subset of the plurality of partial products.

According to one embodiment of the present invention, the first subset comprises even ones of the plurality of partial products.

According to another embodiment of the present invention, the remaining subset comprises odd ones of the plurality of partial products.

According to still another embodiment of the present invention, each of the first and second pluralities of adders comprises a carry-save adder.

According to yet another embodiment of the present invention, the multiplier circuit further comprises a final stage carry-save adder capable of summing the first summation value and the second summation value.

According to a further embodiment of the present invention, the first summation value comprises a first N-bit sum value and a first N-bit carry value and the second summation value comprises a second N-bit sum value and a second N-bit carry value and wherein the final stage carry-save adder compresses the first and second summation values to produce a final summation value comprising a final N-bit sum value and a final N-bit carry value.

According to a still further embodiment of the present invention, the multiplier circuit further comprises a carry-propagate adder capable of adding the final N-bit sum value and the final N-bit carry value to produce a 64-bit resulting sum value and a 1-bit resulting carry value.

According to a yet further embodiment of the present invention, the multiplier circuit is disposed in at least one of a floating point unit and an integer unit in a data processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
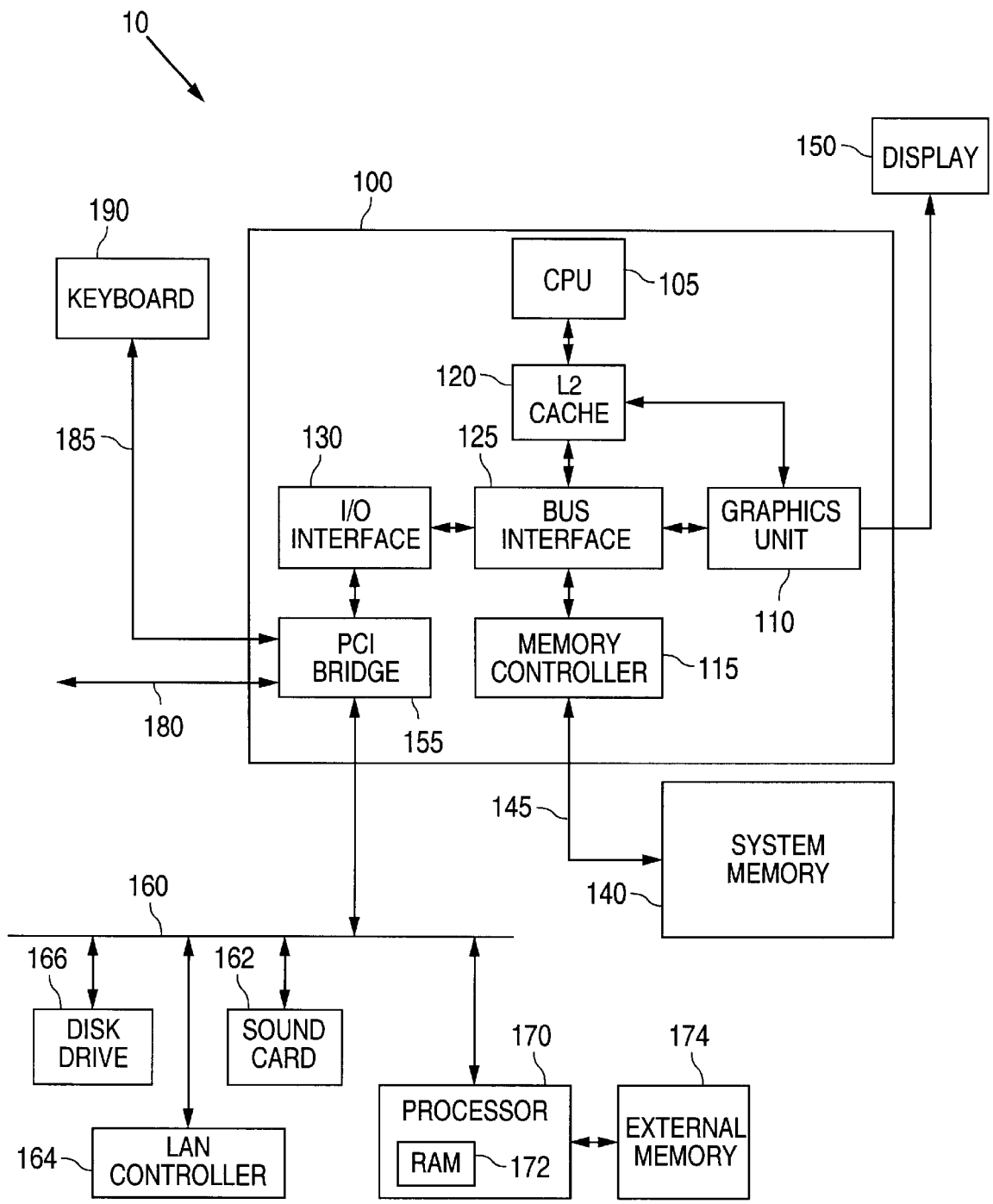
FIG. 1 is a block diagram of an exemplary processing system, which includes an integrated microprocessor according to one embodiment of the present invention.

FIG. 1 is a block diagram of processing system 10, which includes integrated microprocessor 100, according to one embodiment of the present invention. Integrated microprocessor 100 comprises central processing unit (CPU) 105, which has dual integer and dual floating point execution units, separate load/store and branch units, and L1 instruction and data caches. Microprocessor 100 also comprises graphics unit 110, system memory controller 115, and L2 cache 120, which is shared by CPU 105 and graphics unit 110.

Graphics unit 110, system memory controller 115, and L2 cache 120 may be integrated onto the same die as CPU 105. Bus interface unit 125 connects CPU 105, graphics unit 110, and L2 cache 120 to memory controller 115. Bus interface unit 125 also may be integrated onto the same die as CPU 105.

Integrated memory controller 115 bridges microprocessor 100 to system memory 140, and may provide data compression and/or decompression to reduce bus traffic over external memory bus 145 which preferably, although not exclusively, has a RAMbus™, fast SDRAM or other type protocol. Integrated graphics unit 110 provides TFT, DSTN, RGB, and other types of video output to drive display 150.

Bus interface unit 125 connects microprocessor 100 through I/O interface 130 to PCI bridge 155, which has a conventional peripheral component interconnect (PCI) bus interface on PCI bus 160 to one or more peripherals, such as sound card 162, LAN controller 164, disk drive 166, and peripheral processor 170, among others. Bus interface unit 125 also connects fast serial link 180 and relatively slow I/O port 185 to microprocessor 100 (via I/O interface 130 and PCI bridge 155). Fast serial link 180 may be, for example, an IEEE 1394 bus (i.e., "Firewire") and/or a universal serial bus ("USB"). I/O port 185 is used to connect peripherals to microprocessor 100, such as keyboard 190 and/or a mouse. In some embodiments, PCI bridge 155 may integrate local bus functions such as sound, disk drive control, modem, network adapter, and the like.

Peripheral processor 170 may be any one of a wide variety of processing devices that may be implemented in processing system 10. For example, peripheral processor 170 may be a digital signal processor (DSP) that provides a capability for communicating with external devices, such as a digital subscriber line (DSL) Alternatively, peripheral processor 170 may be a dedicated microprocessor that performs only a limited set of function(s) and that is subordinate to microprocessor 100. Peripheral processor 170 may also be a microcontroller device or an ASIC device that is capable of executing instructions retrieved from a memory.

Figure 2:
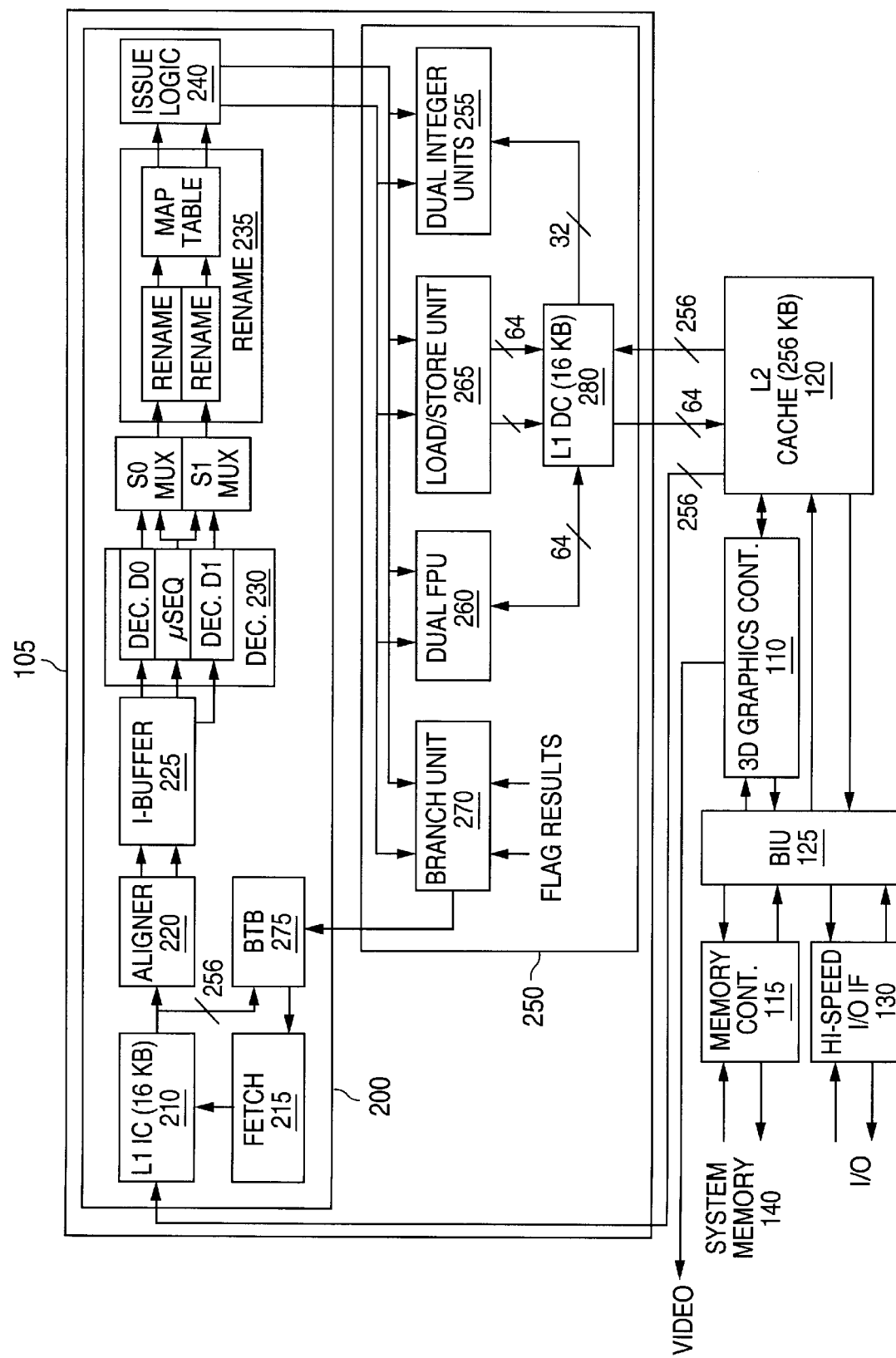
FIG. 2 illustrates in more detail the exemplary integrated processor in FIG. 1, including the CPU, graphics controller, memory controller, and L2 unified cache according to one embodiment of the present invention.

FIG. 2 illustrates in more detail exemplary integrated processor 100, including CPU 105, which is integrated with graphics controller 110, memory controller 115, and L2 unified cache 120 (e.g., 256 KB in size). CPU 105 includes an execution pipeline with instruction decode/dispatch logic 200 and functional units 250.

Instruction decode/dispatch logic 200 decodes variable length x86 instructions into nodes (operations) each containing source, destination, and control logic. Each instruction maps into one or more nodes, which are formed into checkpoints for issue in parallel to functional units 250. The exemplary execution pipeline includes dual integer units (EX) 255, dual pipelined floating point units (FPU) 260, load/store (LDST) unit 265, and branch (BR) unit 270. Hence, a single checkpoint can include up to 2 EX, 2 FP, 1 LDST, and 1 BR nodes which can be issued in parallel. L1 data cache (DC) 280 (e.g., 16 KB in size) receives data requests from LDST unit 265 and, in the case of an L1 hit, supplies the requested data to appropriate EX or FP unit.

BR unit 270 executes branch operations based on flag results from the EX units. Predicted (taken/not-taken) and not-predicted (undetected) branches are resolved (mispredictions incur, for example, a 12 clock penalty) and branch information is supplied to branch target buffer (BTB) 275, including branch address, target address, and resolution (taken or not taken). BTB 275 includes a 1 KB target cache, a 7-bit history and prediction ROM, and a 16-entry return stack.

Instruction decode/dispatch logic 200 includes L1 instruction cache (IC) 210 (e.g., 16 KB in size) which stores 32-byte cache lines (8 dwords/4 qwords). For each fetch operation, fetch unit 215 fetches a cache line of 32 instruction bytes from the L1 instruction cache for transfer to aligner logic 220. Fetch unit 215 either (a) generates a fetch address by incrementing the previous fetch address (sequential fetch) or (b) if the previous fetch address hit in BTB 275, switches the code stream by supplying the fetch address for the cache line containing the target address provided by BTB 275. Fetch unit 215 supplies a linear address simultaneously to L1 instruction cache 210 and BTB 275. A two-level translation look-aside buffer (TLB) structure (a 32-entry L1 instruction TLB and a 256-entry shared L2 TLB) supplies a corresponding physical address to the L1 cache to complete cache access.

Aligner logic 220 identifies up to two x86 variable length instructions per clock. Instructions are buffered in instruction buffer 225, along with decode and issue constraints. Decoder 230 transfers instructions from instruction buffer 225 to the appropriate one (as determined by decode constraints stored with the instruction) of decoders D0, D1, and uSEQ (a microsequencer). Decoders D0 and D1 define two decode slots (or paths) through MUX S0 and MUX S1, with the uSEQ decoder feeding nodes into both slots simultaneously.

Decoders D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to decoder D0. The uSEQ decoder handles instructions that decode into more than two nodes/operations (e.g., far calls/returns, irets, segment register loads, floating point divides, floating point transcendentals). Each such sequence of nodes is organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint. Up to 16 checkpoints may be active (i.e., issued to functional units). Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support MMX and 3DNow instructions, as well as standard x87 floating point, instruction execution. FPU0 includes a pipelined FAdder and FPU1 includes a pipelined Fmultipler, both supporting packed single instruction-multiple data streams (SIMD) operations.

Integer multiply operations are issued to FPU1 with the Fmultiplier, and integer divide operations are issued as separate nodes to both FPU0 and FPU1, so that integer EX operations can execute in parallel with integer multiplies and divides. Results are forwarded between EX0/EX1 and FPU0/FPU1 in a single cycle.

LDST unit 265 executes memory reference operations as loads/stores to/from data cache 280 (or L2 cache 120). LDST unit 265 performs pipelined linear address calculations and physical (paged) address translations, followed by data cache access with the physical (translated) address. Address translations are performed in order using a two-level TLB structure (a 32 entry L1 data TLB and the 256 entry shared L2 TLB). Up to four pending L1 misses can be outstanding. Missed data returns out of order (from either L2 cache 120 or system memory 140).

Exemplary 16 KB L1 instruction cache 210 is single-ported 4-way associative, with 2 pending misses. Exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, L2 cache 120 transfers an entire cache line (32 bytes/256 bits) in one cycle with a 7 clock access latency for L1 misses that hit in L2 cache 120.

Exemplary 256 KB L2 cache 120 is 8-way associative and 8-way interleaved. Each interleave supports one L1 (code/data) miss per cycle, and either one L1 store or one L2 fill per cycle. Portions or all of 2 of the 8 ways may be locked down for use by graphics controller 110.

For integer register-to-register operations, the execution pipeline is eleven (11) stages from code fetch to completion: two cache access stages (IC1 and IC2), two alignment stages (AL1 and AL2), three decode/rename stages (DEC0-DEC2), checkpoint issue stage (ISS), and reservation stage (RS), followed by the execute and result write-back/forward stages (EX and WB). For integer register-memory operations, the LDST unit 265 pipeline adds an additional four stages between RS and EX: address calculation (AC), translation (XL), and data cache access and drive back DC and DB. The floating point adder pipeline comprises four stages and the floating point multiply pipeline comprises five stages.

Figure 3:
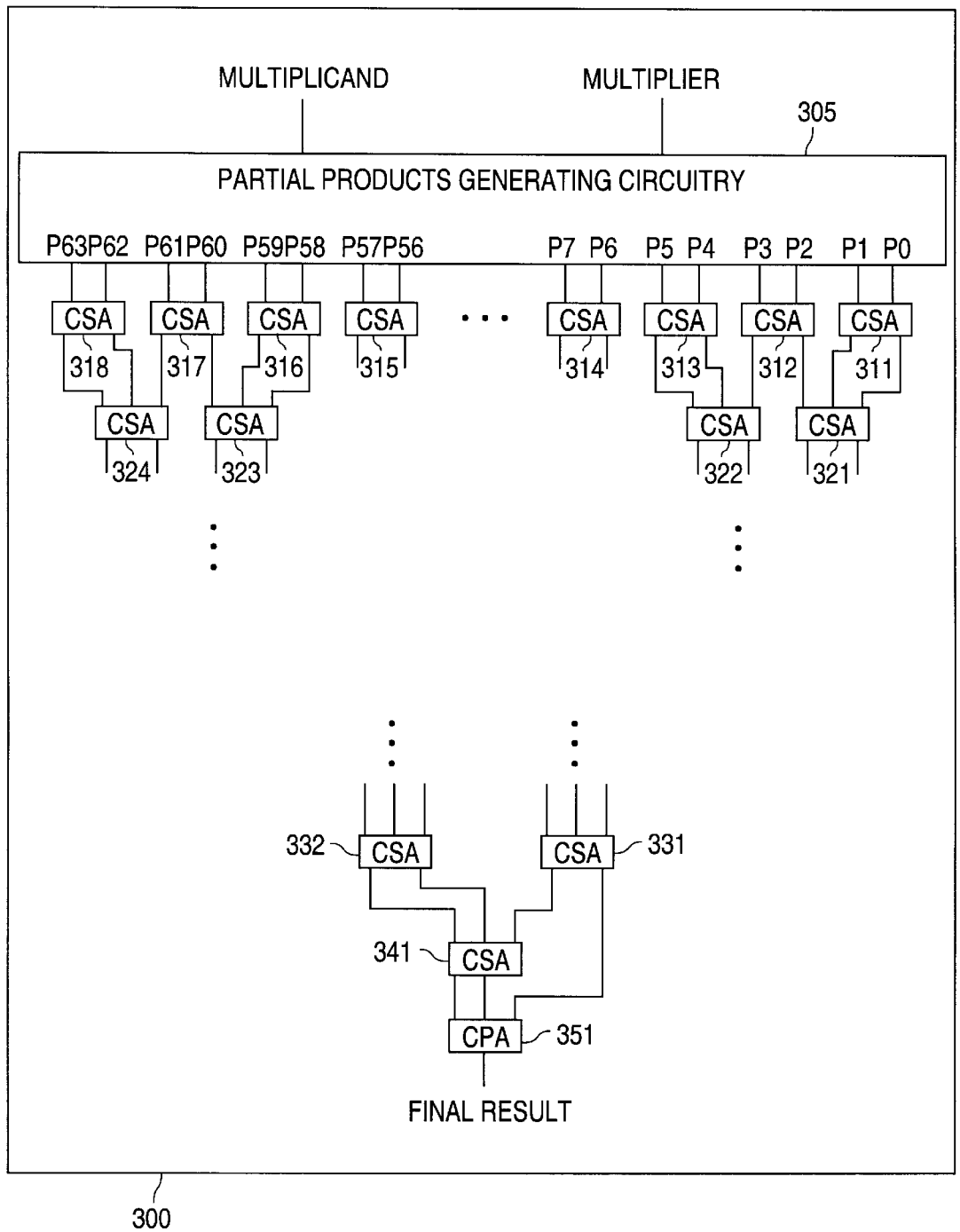
FIG. 3 illustrates an exemplary multiplier containing a tree structure for summing a plurality of partial products according to one embodiment of the prior art.

FIG. 3 illustrates exemplary multiplier 300 containing a tree structure for summing a plurality of partial products according to one embodiment of the prior art. Prior art multiplier 300 may be disposed in either the floating point unit or the integer unit of conventional microprocessors. Multiplier 300 receives a multiplicand and a multiplier, each consisting of, for example, 64 bits, and generates sixty-four (64) partial products, labeled as P0 through P63, each of which comprises 64 bits. The product generated by multiplying two sixty-four bit values may contain as many as 128 bits. However, as will be seen below, the final result is rounded to a 64-bit final value.

The description herein of exemplary multiplier 300 depicts particular bit sizes and data formats for the CSAs in the tree structure. Those skilled in the art will understand that this is by way of illustration only. In alternate embodiments, the partial products formed by multiplier 300 may be the result of Booth recoding the multiplier and the partial products and CSA outputs may contain more than 64 bits or less than 64 bits, or more than 128 bits or less than 128 bits, as the case may be.

Partial products P0–P64 are summed in a tree structure comprising a plurality of carry save adder (CSA) arranged in levels. A first level of carry save adders is represented by exemplary carry save adders CSA 311–318. A second level of carry save adders is represented by exemplary carry save adders CSA 321–324. The tree structure narrows to the next-to-last (fifth) level of carry saver adders comprising CSA 331 and CSA 332, each of which comprises 64 bits. The outputs of CSA 331 and CSA 332 are summed at the sixth level by CSA 341.

Each CSA after the first level of CSAs receives three inputs: a 64-bit sum and a 64-bit carry from a first CSA and a 64-bit sum or a 64-bit carry from a second CSA. Each CSA also has two outputs: a greater than 64-bit sum (typically, 65 or 66 bits) and a greater than 64-bit carry (typically, 65 or 66 bits), since the binary weights of the 64-bit inputs are not the same. For the purpose of simplicity in illustrating FIG. 3, the greater than 64-bit sum bus and the greater than 64-bit carry bus from each CSA are each represented by a single line to the next CSA stage. Thus, each CSA is a 3:2 compressor.

Exemplary multiplier 300 has a propagation delay time through its summing tree structure equal to the delay, D, of each CSA times $\log_n M$ or $D(\log_n M)$, where n is the ratio of inputs to outputs in each CSA (in this case, n=2) and M equals the number of partial products to be summed. For exemplary prior art multiplier 300, $D(\log_2 64)=6D$. The sum and carry outputs of the last CSA, CSA 341, are added by carry propagate adder (CPA) 351, which produces a 128-bit sum output and a single carry bit.

Figure 4:
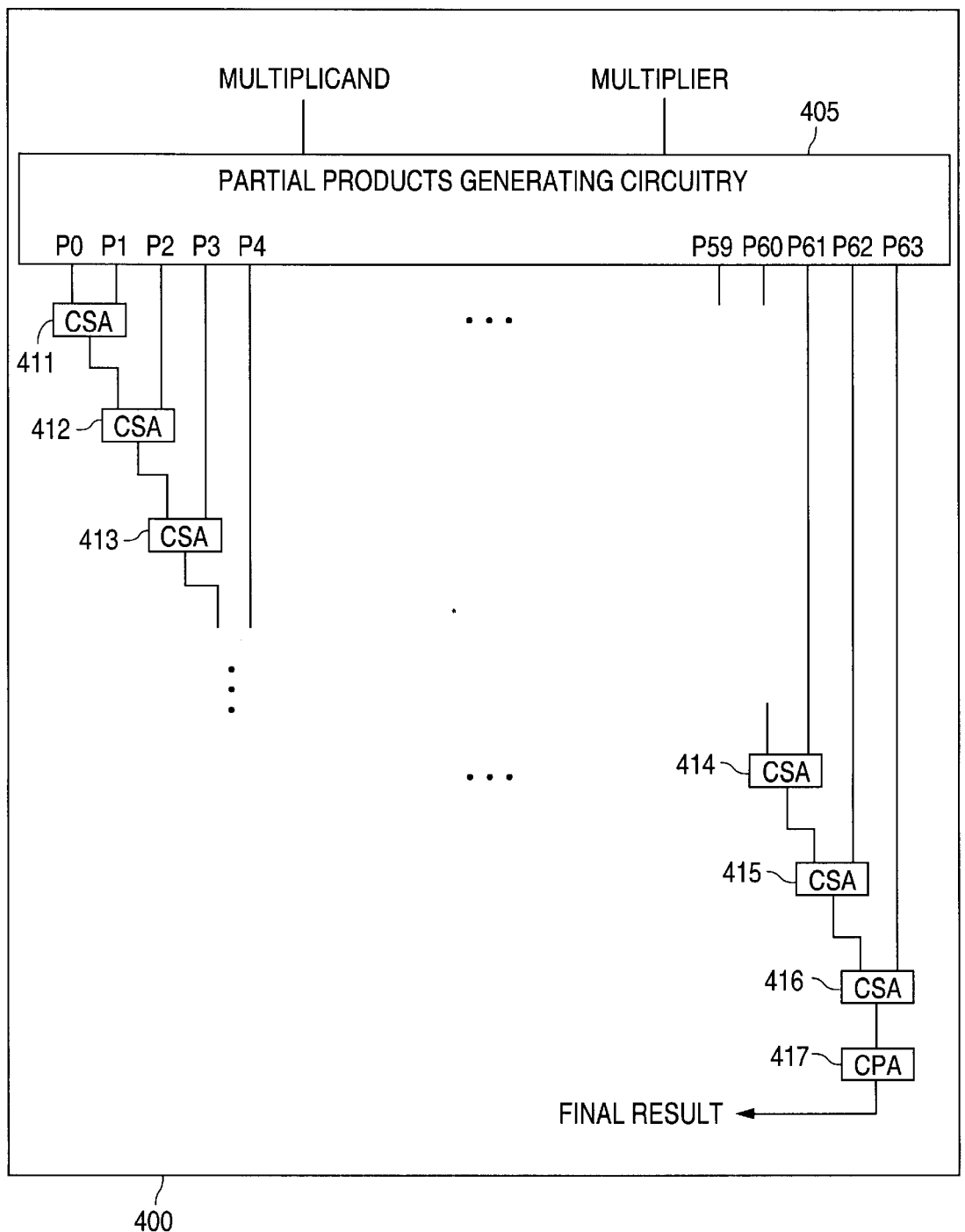
FIG. 4 illustrates an exemplary multiplier containing an array structure for summing a plurality of partial products according to one embodiment of the prior art.

FIG. 4 illustrates exemplary multiplier 400 containing an array structure for summing a plurality of partial products according to one embodiment of the prior art. Prior art multiplier 400 may be disposed in either the floating point unit or the integer unit of conventional microprocessors. Prior art multiplier 400 receives a multiplicand and a multiplier, each consisting of, for example, 64 bits, and generates 64 partial products P0 through P63, each of which comprises 64 bits. In this example, partial products are summed in an array structure comprising a plurality of CSAs, labeled CSA 411 through CSA 416, with the final result being generated by CPA 417. The output of each CSA comprises a greater than 64-bit sum and a greater than 64-bit carry. Again, for the purpose of simplicity in illustrating FIG. 4, the greater than 64-bit sum bus and the greater than 64-bit carry bus from each CSA are each represented by a single line to the next CSA stage.

CSA 411 sums the partial products for the two least significant partial products, P0 and P1. The 64-bit sum and the 64-bit carry outputs from CSA 411 and the 64-bit partial product P2 are added in CSA 412. The 64-bit sum and the, 64-bit carry outputs from CSA 412 and the 64-bit partial product P3 are added in CSA 413. The array pattern continues through CSA 416, which sums the sum and carry outputs of CSA 414 with the most significant 64-bit partial product, P63, to produce a 128-bit sum value and a 128-bit carry value. Finally, the sum and carry outputs of CSA 416 are added in CPA 417 to produce a 128-bit sum and a single carry bit.

The-propagation delay through the array structure is obtained by multiplying the delay, D, introduced by each CSA by 63, the total number of CSA gate delays. The 63D delay through multiplier 400 is greater than the delay through multiplier 300. However, the linear arrangement of circuits for multiplier 400 results in a very straight forward connection pattern which is less complex than for multiplier 300 and easily replicated for lay out. The resulting implementation of multiplier 400 is less complex than multiplier 300 and requires less chip space.

Figure 5:
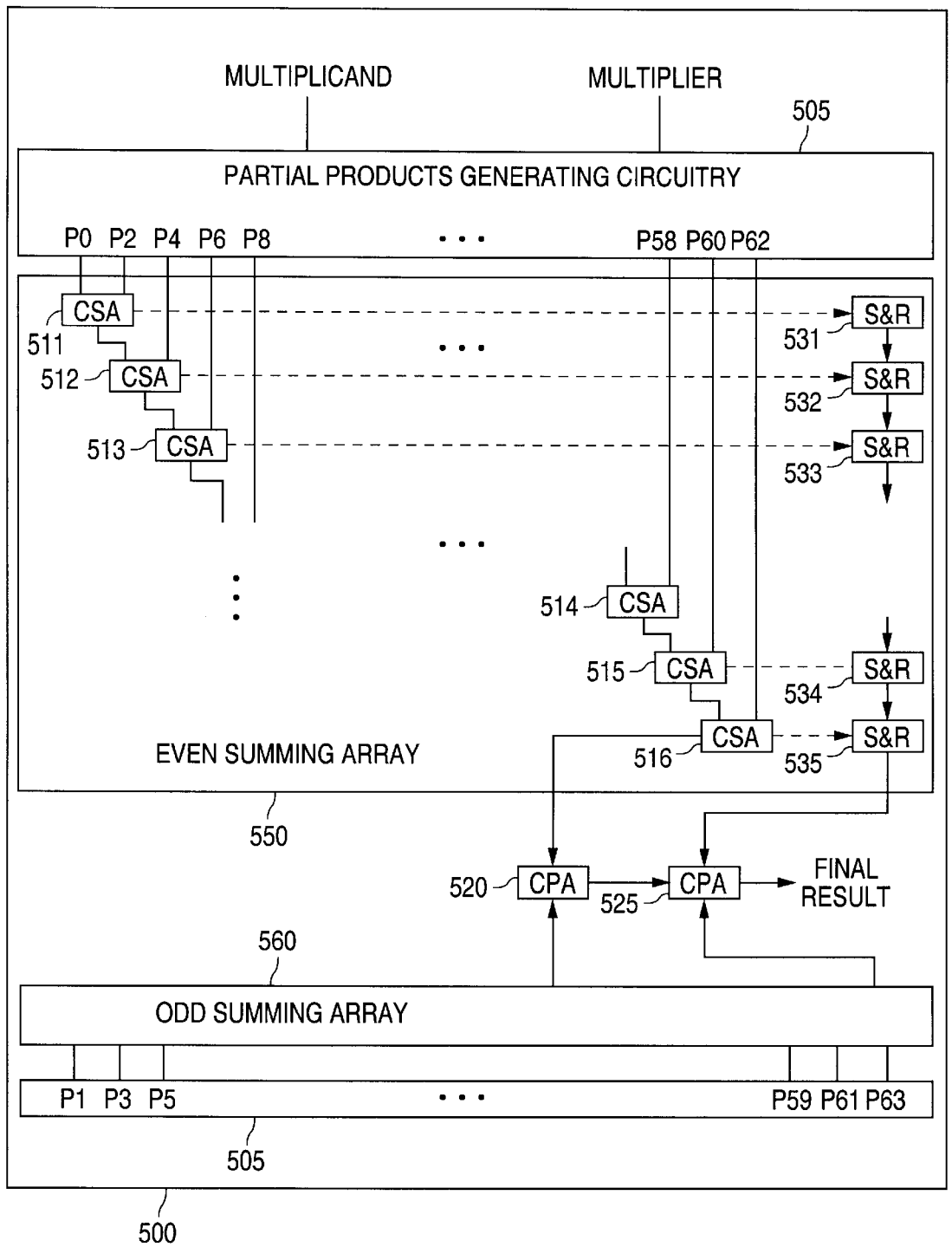
FIG. 5 illustrates an exemplary multiplier containing split odd and even arrays for summing a plurality of partial products according to the principles of the present invention.

The problems inherent in the prior art multipliers may be overcome by the present invention, which splits the array structure in FIG. 4 into two separate array structures that can operate in parallel, thereby reducing the overall delay from 63D to 31D. FIG. 5 illustrates exemplary multiplier 500, for use in one or both of dual floating point units 260 and dual integer units 255, containing even summing array 550 and odd summing array 560 according to the principles of the present invention. Besides the summing arrays, multiplier 260 comprises partial products generating circuitry 505, CSA 520, CPA 525, and a plurality of round bit and sticky bit generating circuits, labeled R&S 531 through R&S 535. For the purpose of simplicity, partial products generating circuitry 505 is shown partitioned as an even section and an odd section. The even partial products from partial products generating circuitry 505 are summed in even summing array 550 and the odd partial products from partial products generating circuitry 505 are summed in odd summing array 560. Odd summing array 560 is functionally identical to even summing array 550. In order to avoid redundant description, only even summing array 550 is illustrated and described below.

The description herein of exemplary multiplier 500 depicts particular bit sizes and data formats for the CSAs in the odd and even summing arrays. Those skilled in the art will understand that this is by way of illustration only. In alternate embodiments, the partial products formed by multiplier 500 may be the result of Booth recoding the multiplier and the partial products and CSA outputs may contain more than 64 bits or less than 64 bits, or more than 128 bits or less than 128 bits, as the case may be.

Even summing array 505 comprises thirty-one carry-save adders, represented in part by CSA 511 through CSA 516, that sum the even partial products (P0, P2, P4, . . . , P58, P60, P62). CSA 511 adds the two least significant 64-bit even partial products, P0 and P2. The output of CSA 511 comprises a 64-bit sum value and a 64-bit carry value. The 64-bit sum and the 64-bit carry outputs from CSA 511 and the next 64-bit even partial product, P4, are added in CSA 512. The array pattern continues through CSA 516, which sums the sum and carry outputs of CSA 515 with the most significant 64-bit even partial product, P62, to produce a 64-bit sum value and a 64-bit carry value. Again, for the purpose of simplicity in illustrating FIG. 5, the 64-bit sum bus and the 64-bit carry bus from each CSA are represented collectively by a single line to the next CSA stage.

The 64-bit sum and the 64-bit carry outputs from CSA 516 and the 64-bit sum and the 64-bit carry outputs from the final CSA in odd summing array 560 are added in CSA 520, which acts as a 4:2 compressor. The 64-bit sum and the 64-bit carry outputs from CSA 520 are then added in CPA 525, to produce a 64-bit sum and a single carry bit.

Multiplier 500 has a simple layout that has the advantages of the layout of multiplier 400. As a result, lines may be of the same length with uniform density throughout the array. However, the array structure in multiplier 500 has a delay of only 31 CSA gate delays. Hence, multiplier 500 is much closer in speed to the tree-based multiplier 300 than it is to multiplier 400.

Furthermore, the least significant bits of the product are available so that a carry bit and a sticky bit can be computed in parallel with the partial product additions, eliminating the need to compute these values after the multiplier array has completed its reduction. Each CSA stage in the array structure has a round bit and sticky bit (R&S) generating circuit associated with it. The round bit and the sticky bit from each R&S generating circuit is used as an input in the R&S generating circuit in the next stage.

The round bit is the bit to the right of the least significant bit in the raw result produced by the multiplier. The sticky bit is used as a tie-breaker to round the raw result when the raw result is exactly half way between the rounded up value and the rounded down value. The sticky bit is equal to zero when the value of all of the bits to the right of the round bit in the raw multiplication result are zero. If the round bit is one and the sticky bit is zero (a tie condition), then the least significant bit is incremented in order to round up the raw result. Otherwise, the raw result is truncated after the least significant bit.

A normal non-booth encoded array multiplier, such as multiplier 500, can have a ripple carry adder built on the side of it, so that the carry into the most significant bits of the multiplier can be done with no added latency (i.e., the ripple carry sums in phase with the summing of the partial products). A similar technique is used in multiplier 500. Instead of summing two bits each carry-save delay, multiplier 500 sums 4×4 bits. This operation is done by first reducing the four bits (two from the even array and two from the odd array) to two bits with a 4:2 counter. The four sets of two bits are then input into a structure similar to a 4-bit carry look-ahead unit, which will produce carry out. The carry look-ahead unit first procures the propagate, generate and kill (PGK) signals for each of the 4 bits. Then, since the P, G and K signals for each bit position are already generated, multiplier 500 can directly compute the sticky bits from these bits without having to actually sum the bits.

In one embodiment of the present invention, multiplier 500 computes sticky bits by compute the complement and then taking the inverse. The sticky bit from a 4-bit sum will only be zero when all inputs are zero or when there is a generated carry that propagates out to the sticky bit. If there are two back-to-back generate signals, the generated carry from the first will not propagate through the second and will produce a sticky. Thus, a 4-bit sticky value may be determined from six OR operations of five terms, as follows:

$$S = \sim(Cin \ \& \ P0 \ \& \ P1 \ \& \ P2 \ \& \ P3) \ OR \sim$$
$$(Cin \ \& \ G0 \ \& \ P1 \ \& \ P2 \ \& \ P3) \ OR \sim$$
$$(Cin \ \& \ K0 \ \& \ G1 \ \& \ P2 \ \& \ P3) \ OR \sim$$
$$(Cin \ \& \ K0 \ \& \ K1 \ \& \ G2 \ \& \ P3) \ OR \sim$$
$$(Cin \ \& \ K0 \ \& \ K1 \ \& \ K2 \ \& \ G3) \ OR \sim$$
$$(Cin \ \& \ K0 \ \& \ K1 \ \& \ K2 \ \& \ K3).$$

The computation of a sticky value for each 4-bit group is independent of all prior groups, so that these can be computed at constant phase delay after the multiplier array has evaluated. The final reduction OR array must evaluate at the speed of the CSAs in the tree, but this not a problem.since it can always be simplified to a 2 input OR gate.

Figure 6:
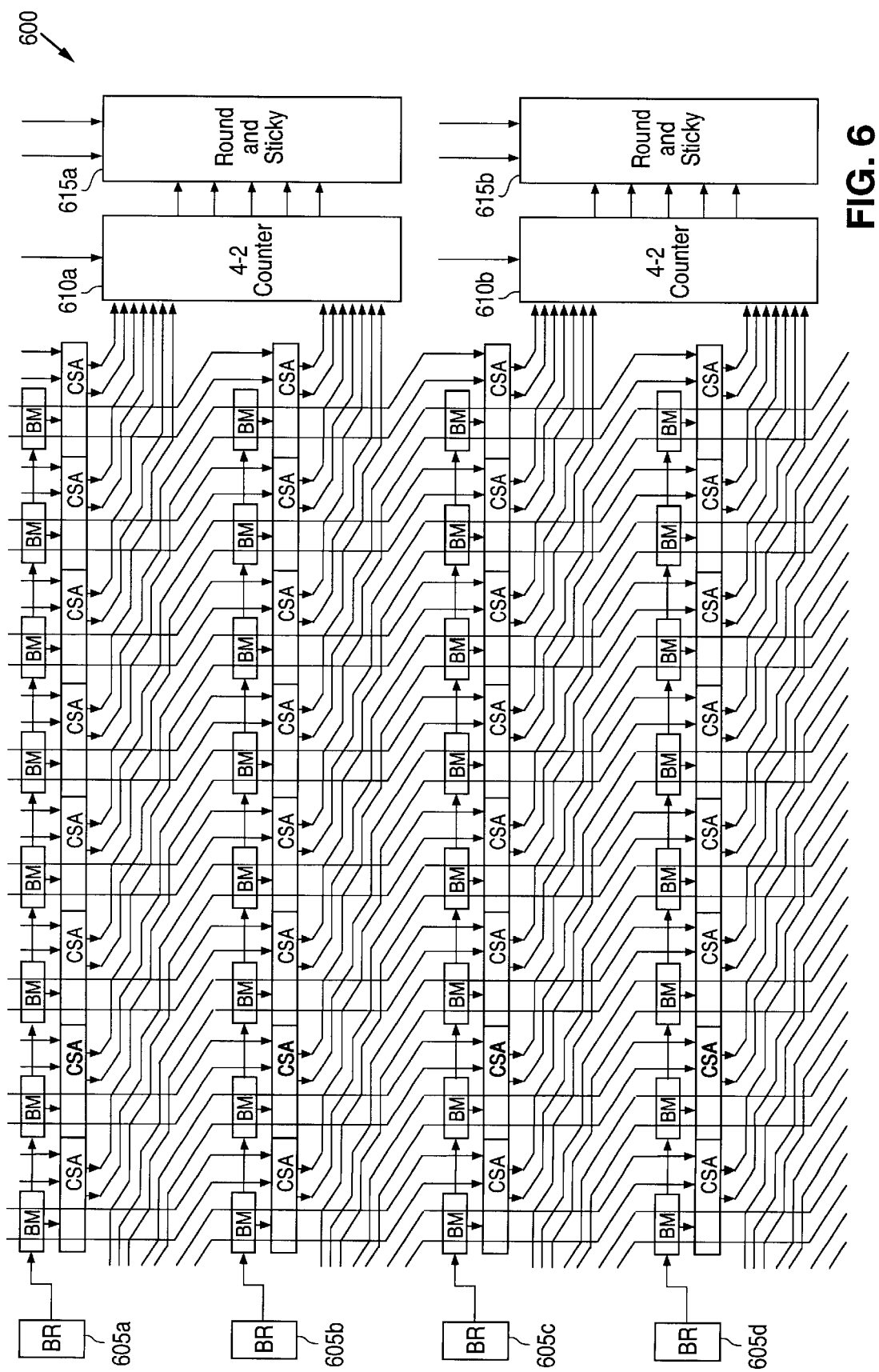
FIG. 6 illustrates a representative section of an exemplary multiplier array interconnection diagram according to one embodiment of the present invention.

FIG. 6 illustrates a representative section 600 of an exemplary multiplier array interconnection diagram according to one embodiment of the present invention. A plurality of Booth re-coders (BR) 605a–d generate partial products that are fed through multiple levels of Booth multiplexers (each labeled "BM") and into corresponding levels of carry-save adders (each labeled "CSA") Each CSA receives three inputs: a partial product and an output from two different CSAs in a previous (higher) level of CSAs.

Additionally, as described above, the least significant bits of the outputs of each CSA product are available so that a carry bit and a sticky bit can be computed in parallel with the partial product additions, eliminating the need to compute these values after the multiplier array has completed its reduction. The least significant bits are compressed in 4:2 counters, 610a and 610b, the outputs of which are transferred to round and sticky units 615a and 615b.

Figure 7:
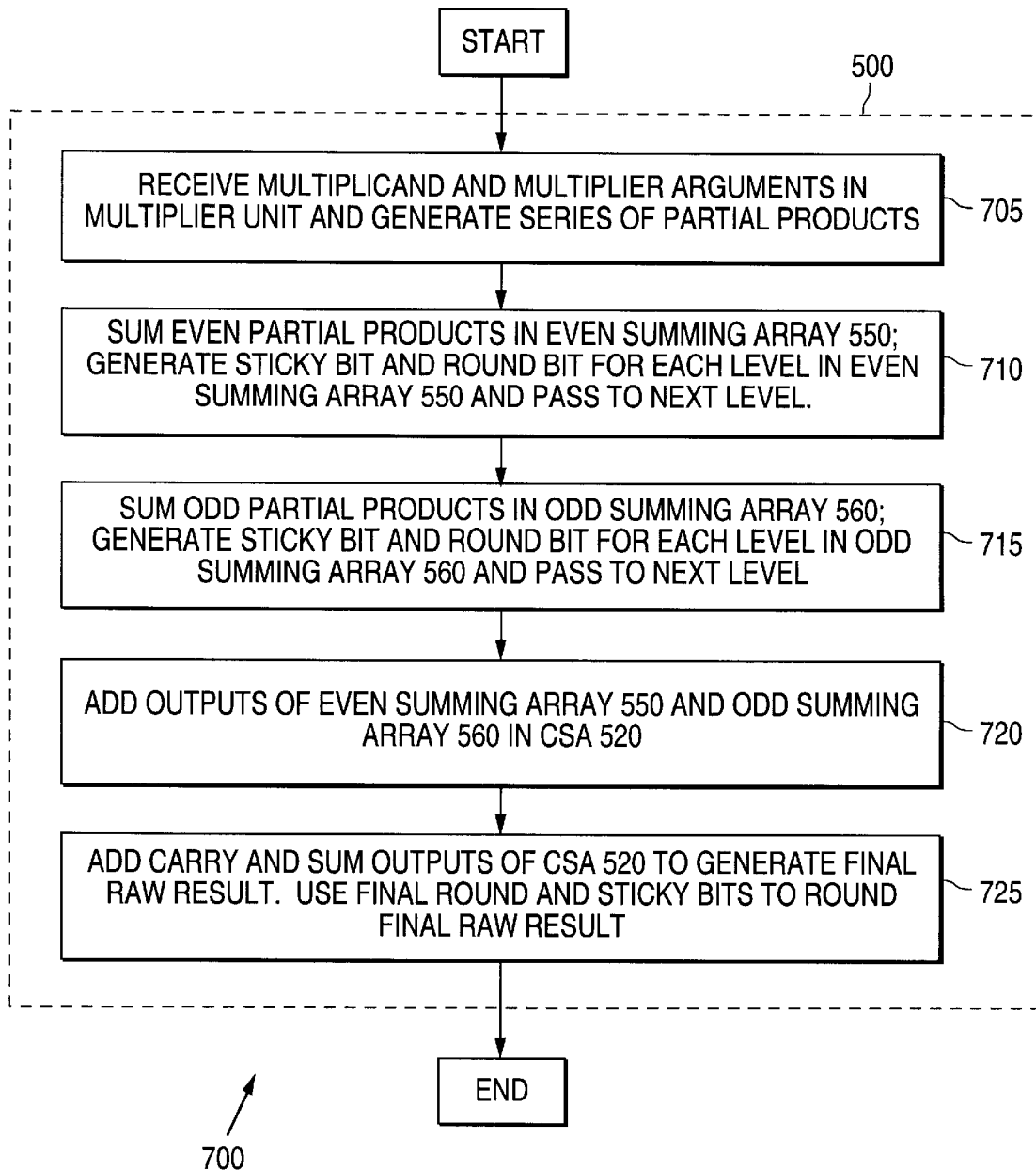
FIG. 7 is a flow diagram illustrating the operation of the exemplary multiplier in FIG. 5 according to one embodiment of the present invention.

FIG. 7 depicts flow diagram 700, which illustrates the operation of exemplary multiplier 500 according to one embodiment of the present invention. Initially, multiplier 500 receives a multiplicand argument and a multiplier argument, each containing, for example, sixty-four bits, and generates a series of sixty-four partial products, P0 through P63 (process step 705). The even numbered partial products are added in even summing array 550. Round and sticky bits are generated in each level of even summing array 550 and are passed to the next level in order to generate cumulative values (process step 710). At the same time, the odd numbered partial products are added in odd summing array 560. Similarly, round and sticky bits are generated in each level of odd summing array 560 and are passed to the next level in order to generate cumulative values (process step 715).

The output of even summing array 550 and odd summing array 560 are then added in 4:2 compressor CSA 520 (process step 720). The sum bus and the carry bus of CSA 520 are then added in CPA 525. The raw result from CPA 525 is rounded using the final round bits and sticky bits from even summing array 550 and odd summing array 560 (process step 725).

Splitting the summation array in prior art multiplier 400 effectively cuts in half the propagation delay through multiplier 500. However, the exemplary splitting of the large array into a smaller even partial products summation array and a smaller odd partial products summation array is not the only type of splitting that may produce a faster multiplier. In alternate embodiments of the present invention, a multiplier array may be split according to other criteria. For example, in one alternate embodiment, the summation array in prior art multiplier 400 may be split into a first array that sums the 32 most significant partial products (i.e., P32–P63) and a second array that sums the 32 least significant partial products (i.e., P0–P31).

However, the summing of partial products P32–P63 generates a value that contributes to bit 32 through bit 127 in the final unrounded result and the summing of partial products P0–P31 generates a value that contributes to bit 0 through bit 95 in the final unrounded result. This misalignment can only be corrected by extensive and complex wiring that creates non-uniform line lengths and non-uniform wiring density.

By contrast, even summing array 550 produces an output value that contributes to bit 0 through bit 65 of the final unrounded result. Similarly, odd summing array 560 produces an output value that contributes to bit 1 through bit 66 of the final unrounded result. The close alignment of these output values requires only comparatively simple wiring on the chip and greatly simplifies multiplier 500.

Although the present invention has been described in detail, those skilled in the art should understand that they can make various changes, substitutions and alterations herein without departing from the spirit and scope of the invention in its broadest form.

What is claimed is:

1. A multiplier circuit comprising:
   a partial products generating circuit capable of receiving a multiplicand value and a multiplier value and generating therefrom a plurality of partial products;
   a first summation array circuit comprising a first plurality of adders capable of summing a first subset of said plurality of partial products to thereby produce a first summation value, wherein said first subset of said partial products comprises even ones of said plurality of partial products; and
   a second summation array circuit comprising a second plurality of adders capable of summing a remaining subset of said plurality of partial products to thereby produce a second summation value, wherein said remaining subset of said plurality of partial products comprises odd ones of said plurality of partial products.

2. The multiplier circuit as set forth in claim 1, wherein each of said first and second pluralities of adders comprises a carry-save adder.

3. The multiplier circuit as set forth in claim 2, further comprising a final stage carry-save adder capable of summing said first summation value and said second summation value.

4. The multiplier circuit as set forth in claim 3 wherein said first summation value comprises a first N-bit sum value and a first N-bit carry value and said second summation value comprises a second N-bit sum value and a second N-bit carry value and wherein said final stage carry-save adder compresses said first and second summation values to produce a final summation value comprising a final N-bit sum value and a final N-bit carry value.

5. The multiplier circuit as set forth in claim 4 further comprising a carry-propagate adder capable of adding said final N-bit sum value and said final N-bit carry value to produce a 64-bit resulting sum value and a 1-bit resulting carry value.

6. The multiplier circuit as set forth in claim 5 wherein said multiplier circuit is disposed in at least one of a floating point unit and an integer unit in a data processor.

7. A data processor comprising a plurality of pipelined execution units, said pipelined execution units comprising at least one of a floating point unit and an integer having at least one multiplier circuit therein, wherein said at least one multiplier circuit comprises:
   a partial products generating circuit capable of receiving a multiplicand value and a multiplier value and generating therefrom a plurality of partial products;
   a first summation array circuit comprising a first plurality of adders capable of summing a first subset of said plurality of partial products to thereby produce a first summation value, wherein said first subset of said partial products comprises even ones of said plurality of partial products; and
   a second summation array circuit comprising a second plurality of adders capable of summing a remaining subset of said plurality of partial products to thereby produce a second summation value, wherein said remaining subset of said plurality of partial products comprises odd ones of said plurality of partial products.

8. The data processor as set forth in claim 7 wherein each of said first and second pluralities of adders comprises a carry-save adder.

9. The data processor as set forth in claim 8 further comprising a final stage carry-save adder capable of summing said first summation value and said second summation value.

10. The data processor as set forth in claim 9 wherein said first summation value comprises a first N-bit sum value and a first N-bit carry value and said second summation value comprises a second N-bit sum value and a second N-bit carry value and wherein said final stage carry-save adder compresses said first and second summation values to produce a final summation value comprising a final N-bit sum value and a final N-bit carry value.

11. The data processor as set forth in claim 10 further comprising a carry-propagate adder capable of adding said final N-bit sum value and said final N-bit carry value to produce a 64-bit resulting sum value and a 1-bit resulting carry value.

12. The data processor as set forth in claim 11 wherein said at least one multiplier circuit comprises a first multiplier disposed in said floating point unit and a second multiplier disposed in said integer unit.

13. For use in a data processor, a method of multiplying a multiplicand value and a multiplier value comprising the steps of:
   generating a plurality of partial products from the multiplicand value and the multiplier value;
   summing a first subset of the plurality of partial products in a first summation array circuit to thereby produce a first summation value, wherein the first subset of the partial products comprises even ones of the plurality of partial products; and
   summing a remaining subset of the plurality of partial products in a second plurality of adders to thereby produce a second summation value, wherein the remaining subset of the plurality of partial products comprises odd ones of the plurality of partial products.

14. The method as set forth in claim 13 wherein each of the first and second pluralities of adders comprises a carry-save adder.

* * * * *